United States Patent [19]

Nagaoka

[11] Patent Number: 4,655,568
[45] Date of Patent: Apr. 7, 1987

[54] AUTOMATIC FILM SENSITIVITY SETTING DEVICE FOR CAMERA

[75] Inventor: Shinji Nagaoka, Yotsukaido, Japan

[73] Assignee: Seiko Koki Kabushiki Kaisha, Chiba, Japan

[21] Appl. No.: 695,896

[22] Filed: Jan. 29, 1985

[30] Foreign Application Priority Data

Jan. 30, 1984 [JP] Japan ............................ 59-11512[U]

[51] Int. Cl.$^4$ .............................................. G03B 7/24
[52] U.S. Cl. .................................................... 354/21
[58] Field of Search ................... 354/21, 289.1, 289.12; 352/78 C

[56] References Cited

U.S. PATENT DOCUMENTS 3,810,200 5/1974 Sakaguchi et al. ............... 354/21
4,200,371 4/1980 Suzuki et al. .................... 354/21
4,431,283 2/1984 Hoda et al. ...................... 354/21

Primary Examiner—William B. Perkey
Attorney, Agent, or Firm—Robert E. Burns; Emmanuel J. Lobato; Bruce L. Adams

[57] ABSTRACT

An automatic film sensitivity setting device uses part of electrical contacts provided on a film patrone of CAS system to produce from two-bit information a voltage signal indicating the film sensitivity index for the exposure control circuit of a camera. The device includes the circuit for setting the film sensitivity index manually.

16 Claims, 6 Drawing Figures

AUTOMATIC FILM SENSITIVITY SETTING DEVICE FOR CAMERA

BACKGROUND OF THE INVENTION

The present invention relates to an automatic film sensitivity setting device for a camera and more, particularly, to a device for producing an electrical signal by utilization of the electrical contacts provided on a film patrone and delivering the signal to an exposure control circuit of an electronic shutter so that the proper exposure control is implemented.

Recently, a U.S. firm Eastman Kodak has commercialized the Camera Auto Sensing (CAS) system, in which the film patrone or cartridge is provided with six electrical contacts for providing 5-bit digital information relating to the film sensitivity. The inventor of the present invention has already proposed the method of entering the film sensitivity data to the camera by using these contacts. However, conventional systems need a D/A converter for transforming the 5-bit digital data into an analog signal, or a code conversion circuit in the case of a digital exposure control system, resulting in a complex and expensive circuit arrangement.

The above-mentioned CAS system allows the use of 24 kinds of film sensitivity indices ranging from 25 through 5000 in the ISO system. However, the film sensitivity available currently and used frequently in practice is less in variety.

SUMMARY OF THE INVENTION

In view of the foregoing practicalities, the present invention contemplates to cut the cost and gain the compactness of a camera by simplifying the film data entry circuit through the use of only two bits, out of the five bits of the CAS system, which allows the distinction of four frequently used film sensitivity indices. This design is expected to suffice for performing the automatic film sensitivity setting for nonprofessional-oriented cameras. In addition, the inventive arrangement further includes a manual setting function, allowing ultimately the setting of arbitrary sensitivity index in manual mode, besides the automatic setting for four kinds of normally used sensitivity index.

DETAILED DESCRIPTION OF THE INVENTION

Figure 1:
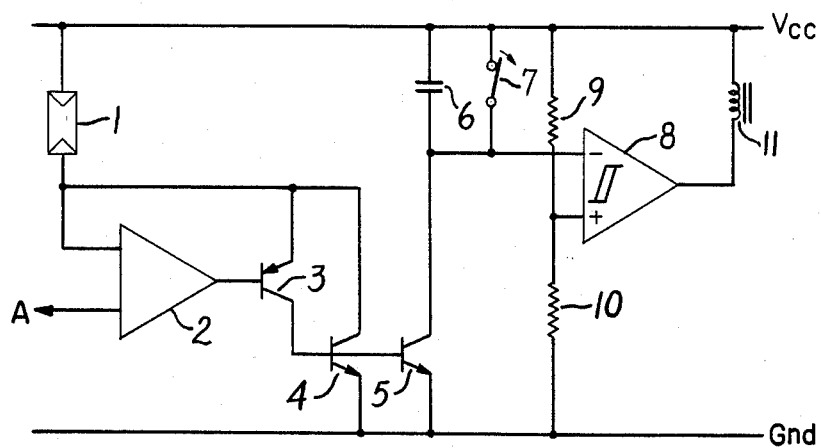
FIG. 1 is a schematic diagram showing, as an example, an exposure control circuit to which the present invention is applied.

An embodiment of the present invention will now be described with reference to the drawings. The exposure control circuit shown in FIG. 1 includes a photoconductive element 1, an operational amplifier 2 having an input terminal connected to the photoconductive element 1 and another input terminal A for receiving a voltage corresponding to the film sensitivity, as will be described later, a transistor 3 forming a feedback circuit for the amplifier 2, a transistor 4 used for logarithmic compression of the signal, a transistor 5 used for expansion of the signal with its collector electrode connected to a timer capacitor 6 so that the film exposure time is determined by the collector current, a timing switch 7 which turns from on to off when the shutter begins to open, a voltage comparator 8 with its one input terminal receiving the voltage of the timer capacitor and another input terminal receiving a reference voltage produced by voltage division resistors 9 and 10, and an electromagnetic 11 which operates to close the shutter when deenergized in response to the transition of the output of the comparator 8.

Figure 2:
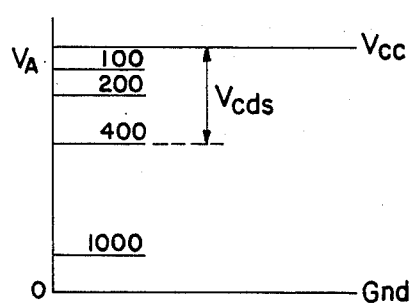
FIG. 2 is a graph used to explain the operation of the circuit shown in FIG. 1.

Next, the operation of the foregoing arrangement will be described with reference to FIG. 2. First, when power is turned on, the electromagnetic 11 is energized, and the control circuit enters the ready state. The operational amplifier 2 receives on its input terminal A a voltage which varies depending on the ISO index of film sensitivity as shown in FIG. 2. Since the other input terminal of the amplifier 2 is connected to the photoconductive element 1, when a film sensitivity of, for example, ISO 400 is set, a voltage Vcds is applied to the photoconductive element 1. By setting the voltages $V_A$ at the input A so that the voltage Vcds applied to the element 1 varies in steps of 2-fold, 4-fold, and so on corresponding to ISO indices 100, 200, 400, and so on, optical information received by the photoconductive element 1 is processed in terms of information on film sensitivity provided as a voltage $V_A$, and a voltage on the logarithmic scale is produced between the base and emitter electrodes of the transistor 4. The compressed logarithmic voltage output is expanded in the collector current of the transistor 5. When the shutter release member (not shown) is depressed to open the shutter, the timing switch 7 is turned off and the timer capacitor 6 is charged by the constant collector current of the transistor 5. The charging voltage is verified by the comparator 8, and when it falls below the reference voltage at the non-inverting input, the electromagnet 11 is deenergized to close the shutter.

Figure 3:
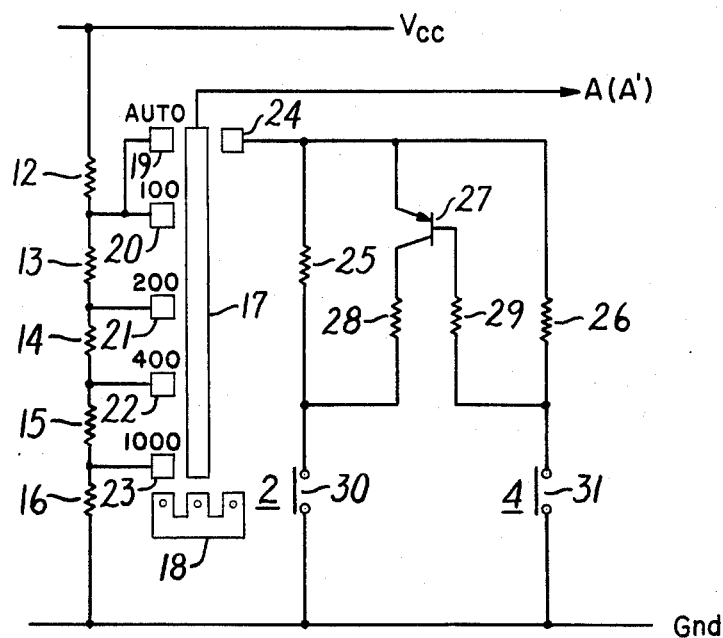
FIG. 3 is a schematic diagram showing the circuit section in the inventive automatic film sensitivity setting device for generating a voltage in correspondence to the film sensitivity.

FIG. 3 shows, as an example, the circuit section of the inventive device for generating electrical output signals in the form of a voltage representative of film sensitivity information. The arrangement includes a voltage division circuit having a bank of resistors 12–16 used to generate a voltage for manual setting, and mode-selecting means comprising a selector switch having a common stationary contact 17 which defines an output terminal and a movable contact 18 used for manual setting and also used to select the automatic or manual setting mode. Contacts 19 and 24 are selected together to specify the automatic setting mode and contacts 20–23 which define reference terminals are used for manual setting by being connected selectively to the common contact 17 by the movable contact 18. The arrangement further includes resistors 25 and 26 used for automatic setting, and a transistor 27 which is made conductive through its base resistor 27 when a DX contact 4 is closed and adapted to lead a collector current through a resistor 28 when a DX contact 2 is closed. These resistors are chosen so that the base current of the transistor 27 is sufficiently small as compared with the collector current flowing through the resistor 28 and the currents flowing through the resistors 25 and 26.

Next, the operation of the foregoing arrangement will be described using the following tables.

TABLE 1

| ISO | 2 | 3 | 4 | 5 | 6 |
|---|---|---|---|---|---|
| 100  |   | O |   | O |   |
| 200  | O | O |   | O |   |
| 400  |   |   | O | O |   |
| 1000 | O |   | O |   | O |

TABLE 2

|      | 2 | 4 |
|---|---|---|
| 100  |   |   |
| 200  | O |   |
| 400  |   | O |
| 1000 | O | O |

Table 1 is a coding table according to the CAS system for setting up the electrical contacts 2-6 (referred to as DX contacts provided on the film patrone or cartridge for four kinds of film sensitivity indices, ISO 100, 200, 400 and 1000 exemplified in this embodiment. Mark "O" in the table indicates a closed contact, and unmarked contacts are left open. Table 2 is a coding table according to the present invention, in which only DX contacts 2 and 4 are used to set the above four kinds of film sensitivity indices in the automatic setting mode.

In FIG. 3, when the selector switch is set to the automatic setting mode, the movable contact 18 is placed at the top position (AUTO), and the contact 24 connects with the output terminal or common contact 17. Subsequently, when a film of ISO-100 is loaded in the camera, both of the DX contacts 2 and 4 remain open in compliance with Table 2, and therefore the output voltage at point A is the voltage across the resistor bank 12-16 divided by the sum of resistors 13-16, and it is equal to the manual setting voltage for ISO-100. In the case of a film of ISO-200, the DX contact 2 is closed and contact 4 is left open, and the resistor 25 has been chosen such that it pulls down the output voltage to such a voltage level as is suitable for the input voltage $V_A$ for the circuit of FIG. 1. Similarly, for a film of ISO-400, the DX contact 4 is closed and contact 2 is left open, and the voltage $V_A$ is modified by the resistor 26.

When a film of ISO-1000 is loaded, the DX contacts 2 and 4 are both closed, causing the transistor 27 to become conductive between its emitter and collector electrodes, and the contact 24 is shunted through the parallel connection of resistors 25, 26 and 28 to the ground, thereby producing the output voltage corresponding to ISO-1000. Thus, in the automatic mode, one of four different output signals ("auto" signals) of different voltage levels is applied to the output terminal 17 depending on whether contacts are present or absent on the film cartridge at none, one, the other or both of the positions corresponding to the DX contacts 2 and 4.

In the manual setting mode, the photographer operates the selector switch to place the movable contact 18 on one of the reference terminals or contacts 20-23 correspondingly to the ISO index of the film loaded in the camera, and a proper divided voltage is conducted to the output terminal or common contact 17. In this case, even if a film with DX contacts is loaded, causing contact 2 and/or 4 to close, the automatic setting circuit section is isolated from the manual setting circuit section by the open contact 24. In the manual mode, one of the different voltage levels appearing on the reference terminals 20-23 is applied as an output signal ("manual" signal) to the output terminal 17 to thereby enable manual setting of the film sensitivity.

Figure 6:
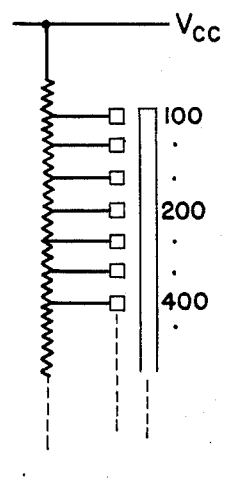
FIG. 6 is a schematic diagram showing another embodiment of the film sensitivity selector switch used in manual mode.

Although in this embodiment only the same four ISO indices are available for selection in the manual setting mode as in the automatic setting mode, it is much preferable to allow in the manual mode a greater selection of sensitivity settings which cannot be set in the automatic setting mode through a selector switch having a greater number of manually selectable settings than automatically selectable settings as shown in FIG. 6.

Figure 4:
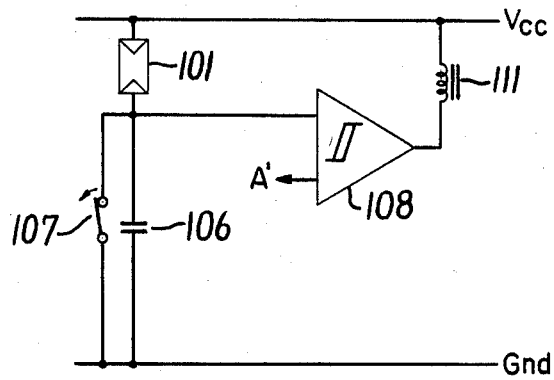
FIG. 4 is a schematic diagram showing another example of the exposure control circuit to which this invention is applicable.

FIG. 4 shows another embodiment of the exposure control circuit to which the present invention is intended to apply. The arrangement includes a photoconductive element 101, a timer capacitor 106, a timing switch 107 which turns off when the shutter begins to open, a voltage comparator 108 with its one input receiving a voltage across the timer capacitor 106 and the other input receiving a voltage $A'$ representing the film sensitivity index, and an electromagnet 111 operating to close the shutter in the same way as in the case of FIG. 1.

Figure 5:
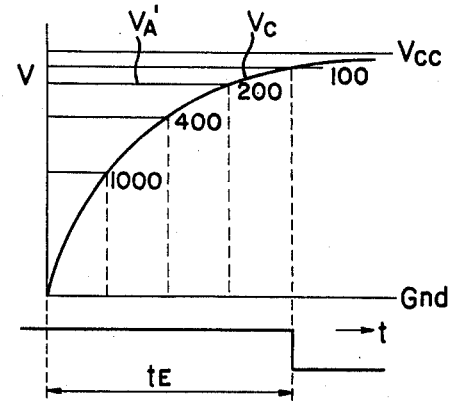
FIG. 5 is a graph used to explain the operation of the circuit shown in FIG. 4.

FIG. 5 shows the operation of the arrangement in FIG. 4 and waveform Vc is the charging voltage of the timer capacitor 106, and each voltage level $V_A'$ at point $A'$ in FIG. 4 represents the ISO index. Time 0 on the horizontal time axis is the time point when the timing switch 107 turns from on to off. For example, when a film of ISO-100 is used, the voltage comparator 108 makes a transition of output in response to the charging voltage of the timer capacitor 106 reaching $V_A$ for ISO-100 on the chart, and the electromagnet 111 is deenergized to close the shutter. The exposure time produced by the above operation is shown by $t_E$ on the chart. Also in this embodiment, the manual setting resistor bank 12-16 and automatic setting resistors 25, 26 and 28 are chosen so that the voltages corresponding to respective ISO indices are produced in each setting mode.

As described above, the inventive automatic film sensitivity setting device uses only two bits of information provided by some of the DX contacts of the CAS system, thereby providing the automatic film sensitivity setting function for the most commonly used four kinds of sensitivity indices through an extremely simple circuit arrangement.

What is claimed is:

1. An automatic film sensitivity setting device for use with an electronic shutter exposure control circuit which receives in use luminous information and a voltage representative of a film sensitivity index, said device comprising: a voltage division circuit comprised of a plurality of voltage division resistors connected in series across a power source, at least one additional resistor connectable in parallel across some of said voltage division resistors through an electrical contact provided on a film cartridge to indicate a film sensitivity index, a serial connection of a transistor having its emitter and collector electrodes connected in series with a further resistor such that said serial connection is connected across said at least one additional resistor, said transistor becoming conductive by being biased on its base electrode through another electrical contact provided on the film cartridge, selector switch having a common contact, a plurality of contacts connected to nodes of adjoining ones of said voltage division resistors, and another contact connected commonly to said at least one additional resistor and transistor, so that a corresponding divided voltage is selected in a manual setting mode or said at least one additional resistor is coupled to one node of said voltage division circuit in an automatic setting mode, whereby a voltage representative of a film sensitivity is produced on said common contact by manual setting or by automatic setting in accordance with said electrical contacts on the film cartridge.

2. An automatic film sensitivity device according to claim 1, wherein said voltage division circuit produces a voltage representative of a specific film sensitivity index when said electrical contacts provided on the film cartridge are open.

3. An automatic film sensitivity setting device for a camera of the type equipped to receive a film cartridge containing plural electrical contacts disposed at predetermined positions in a prescribed pattern to represent the sensitivity of the film in the cartridge, the device comprising: an output terminal; and circuit means responsive to the presence or absence of film cartridge contacts at only two positions on the film cartridge for producing at the output terminal one of four different electrical "auto" output signals corresponding respectively to one of four different film sensitivity settings depending on whether film cartridge contacts are present at none, one, the other or both of said two positions.

4. An automatic film sensitivity setting device according to claim 3; wherein the circuit means includes means for producing one of four different electrical "auto" output signals corresponding respectively to film sensitivity settings of ASA 100, 200, 400 and 1000.

5. An automatic film sensitivity setting device according to claim 3; wherein the circuit means is selectively operable in automatic and manual film sensitivity setting modes and comprises a voltage division circuit comprised of a bank of series-connected resistors and a plurality of switch contacts connected to connection points of adjoining resistors, at least one additional resistor connectable in parallel with some of the series-connected resistors, a series connection of a transistor having its emitter-collector path connected in series with a further resistor and the series connection being connected in parallel with said at least one additional resistor, and switching means for selectively switching the circuit means between the automatic and manual modes, the switching means having a manually movable switch contact movable to one position to connect said at least one additional resistor to the output terminal and in parallel across some of the series-connected resistors thereby placing the circuit means in the automatic mode and movable to other positions to connect respective ones of the switch contacts to the output terminal thereby placing the circuit means in the manual mode.

6. An automatic film sensitivity setting device according to claim 5; wherein the circuit means comprises a second additional resistor connected in parallel with said one additional resistor, a first normally open switch connected to said one additional resistor and switchable to a closed state in response to the presence of a film cartridge contact at one of said two positions, a second normally open switch connected to said second additional resistor and switchable to a closed state in response to the presence a of film cartridge contact at the other of said two positions, and a series connection of the emitter-base path of said transistor connected in series with another resistor and said series connection being connected in parallel with said second additional resistor.

7. An automatic film sensitivity setting device according to claim 6; wherein the circuit means includes means for producing one of four different electrical "auto" output signals corresponding respectively to film sensitivity settings of ASA 100, 200, 400, and 1000.

8. An automatic film sensitivity setting device according to claim 3; wherein the circuit means is selectively operable in automatic and manual film sensitivity setting modes and includes means for producing at respective reference terminals four different electrical "manual" output signals corresponding respectively to four different manually settable film sensitivity settings, and mode-selecting means for selecting and applying to the output terminal either the "auto" output signal produced in dependence on the presence or absence of film cartridge contacts at said two positions thereby selecting the automatic mode or one of the "manual" output signals appearing on one of the reference terminals thereby selecting the manual mode.

9. An automatic film sensitivity setting device according to claim 8; wherein the means for producing electrical output signals at the reference terminals comprises voltage-dividing means for producing four different electrical "manual" output signals having four different voltage levels, and means including the voltage-dividing means for producing one of four different electrical "auto" output signals of respectively different voltage levels in dependence on the presence or absence of film cartridge contacts at said two positions.

10. An automatic film sensitivity setting device according to claim 9; wherein the voltage-dividing means includes a bank of series-connected resistors with the reference terminals being connected between connection points of different pairs of adjoining resistors, and the means including the voltage-dividing means comprises means connected in parallel with some of the series-connected resistors when the circuit means is in the automatic mode.

11. An automatic film sensitivity setting device according to claim 10; wherein the mode-selecting means comprises a movable contact manually movable to different manual mode positions to connect different ones of the reference terminals to the output terminal to apply to the output terminal a manually selected one of the "manual" output signals and movable to an automatic mode position to apply to the output terminal the automatically selected "auto" output signal.

12. An automatic film sensitivity setting device according to claim 11; wherein the output terminal comprises an elongate stationary contact, the reference terminals being disposed in spaced relation along the stationary contact, and the movable contact being slidably movable along the stationary contact to connect respective ones of the reference terminals to the stationary contact.

13. An automatic film sensitivity setting device according to claim 8; wherein the mode-selecting means comprises a movable contact manually movable to different manual mode positions to connect different ones of the reference terminals to the output terminal to apply to the output terminal a manually selected one of the "manual" output signals and movable to an automatic mode position to apply to the output terminal the automatically selected "auto" output signal.

14. An automatic film sensitivity setting device according to the claim 13; wherein the output terminal comprises an elongate stationary contact, the reference terminals being disposed in spaced relation along the stationary contact, and the movable contact being slidably movable along the stationary contact to connect respective ones of the reference terminals to the stationary contact.

15. An automatic film sensitivity setting device according to claim 13; wherein the means for producing at respective terminals four different electrical "manual" output signals comprises means for producing at respective terminals more than four different electrical "manual" output signals corresponding respectively to different manually settable film sensitivity settings.

16. An automatic film sensitivity setting device according to claim 8; wherein the means for producing at respective terminals four different electrical "manual" output signals comprises means for producing at respective terminals more than four different electrical "manual" output signals corresponding respectively to different manually settable film sensitivity settings.

* * * * *